US012194471B2

(12) United States Patent
Green

(10) Patent No.: US 12,194,471 B2
(45) Date of Patent: Jan. 14, 2025

(54) GRATE SUPPORT ELEMENT, GRATE SUPPORT STRUCTURE AND OPEN-ENDED GRINDING MILL

(71) Applicant: METSO FINLAND OY, Espoo (FI)

(72) Inventor: Nicholas John Green, Oslo (NO)

(73) Assignee: Metso Finland Oy, Espoo (FI)

( * ) Notice: Subject to any disclaimer, the term of this patent is extended or adjusted under 35 U.S.C. 154(b) by 188 days.

(21) Appl. No.: 17/788,924

(22) PCT Filed: Dec. 30, 2019

(86) PCT No.: PCT/FI2019/050929
§ 371 (c)(1),
(2) Date: Jun. 24, 2022

(87) PCT Pub. No.: WO2021/136865
PCT Pub. Date: Jul. 8, 2021

(65) Prior Publication Data
US 2023/0029774 A1 Feb. 2, 2023

(51) Int. Cl.
*B02C 17/18* (2006.01)

(52) U.S. Cl.
CPC ................................ *B02C 17/1855* (2013.01)

(58) Field of Classification Search
CPC .. B02C 17/1835; B02C 17/1855; B02C 17/04
See application file for complete search history.

(56) References Cited

U.S. PATENT DOCUMENTS 1,690,493 A 11/1928 Marcy
2,023,331 A * 12/1935 Lowenhielm ....... B02C 17/1855 241/70
2,376,820 A 5/1945 Saumenicht
4,646,980 A * 3/1987 Player ................ B02C 17/1855 241/179
5,361,997 A * 11/1994 Burkes ................ B02C 17/1855 241/70

(Continued)

FOREIGN PATENT DOCUMENTS

CN 106378238 B 9/2018
CN 108704722 A 10/2018

(Continued)

OTHER PUBLICATIONS

Office Action in corresponding Chilean Patent Application No. 202201763, dated Dec. 27, 2023.

(Continued)

*Primary Examiner* — Faye Francis
(74) *Attorney, Agent, or Firm* — Andrus Intellectual Property Law, LLP

(57) ABSTRACT

A grate support element for an open-ended grinding mill includes an outer perimeter section, an inner section, and at least one vane extending between the outer perimeter section and the inner section of the grate support element. The vane is angled with respect to a plane defined by the outer edge of the outer perimeter section in such a manner that the inner section is configured to be provided outwards from the plane defined by the outer edge of the outer perimeter section, when the grate support element is mounted to the open-ended grinding mill.

18 Claims, 4 Drawing Sheets

(56) References Cited

U.S. PATENT DOCUMENTS

| | | | | |
|---|---|---|---|---|
| 6,663,030 | B2 * | 12/2003 | Washburn | B02C 17/1855 241/70 |
| 8,109,457 | B2 * | 2/2012 | Latchireddi | B02C 17/1855 241/70 |
| 9,289,775 | B2 * | 3/2016 | Mepham | B02C 17/1835 |
| 10,427,164 | B2 * | 10/2019 | Mepham | B02C 17/1855 |
| 10,814,331 | B2 * | 10/2020 | Canabes Guerra | B02C 17/1825 |
| 11,123,741 | B2 * | 9/2021 | McPhee | B02C 13/282 |
| 11,666,923 | B2 * | 6/2023 | Kumar | B02C 17/22 241/46.01 |
| 2003/0178516 | A1 * | 9/2003 | Washburn | B02C 17/1855 241/69 |
| 2011/0146933 | A1 * | 6/2011 | Page | B02C 17/1855 162/232 |
| 2014/0138466 | A1 * | 5/2014 | Mepham | B02C 17/1835 241/70 |
| 2017/0144165 | A1 * | 5/2017 | Latchireddi | B02C 17/1855 |
| 2020/0023373 | A1 * | 1/2020 | McPhee | B02C 17/1855 |

FOREIGN PATENT DOCUMENTS

| | | | |
|---|---|---|---|
| CN | 110237902 | A | 9/2019 |
| CN | 215541620 | U | 1/2022 |
| GB | 317769 | A | 11/1930 |
| UA | 20161385 | | 9/2017 |
| WO | 2009143615 | A1 | 12/2009 |

OTHER PUBLICATIONS

Extended European Search Report for European Patent Application No. 19958668.6, dated Sep. 25, 2023.

International Search Report and Written Opinion for PCT Application No. PCT/FI2019/050929, mailed Apr. 14, 2020.

Office Action for Chinese Patent Application No. 202011612931.9, issued Jun. 5, 2024.

* cited by examiner

GRATE SUPPORT ELEMENT, GRATE SUPPORT STRUCTURE AND OPEN-ENDED GRINDING MILL

CROSS-REFERENCE TO RELATED APPLICATIONS

This application is the U.S. national stage application of International Application PCT/FI2019/050929, filed Dec. 30, 2019, which international application was published on Jul. 8, 2021, as International Publication WO 2021/136865 A1 in the English language.

BACKGROUND

The invention relates to grinding mills, and more particularly to opens ended grinding mills.

Grinding mills, specifically semi autogenous and autogenous mills, rely on their ability to generate impact breakage of the ore charge and transport the ground material through the discharge pulp lifters out of the mill. It is common with increasing mill diameters and flow rates for the discharge arrangement to restrict the performance of the mill by limiting material transfer rates and grinding efficiency. This is due to an inability to transport the ground material through the grate and pulp lifters limiting the transfer rate due to slurry flow back/short circuiting and carry over. The impact of this restriction in mill flow rate is a reduction in mill performance (product size) due to the resulting slurry pool which dissipates the energy of the balls/ore impacting the toe of the charge.

Open-ended mills can provide a solution to this problem removing the need for pulp lifters such that slurry can flow unhindered though the grate and out of the mill. However, this approach has been limited to very small grinding mills, as the open-ended design, and especially grates used in such open-ended grinding mills, have not been sufficiently stiff to support larger charge loads.

Using the solutions currently known in the art, Open-ended Grinding Mill technology is limited to small grinding mills only, or only partially open end grinding mills.

BRIEF DESCRIPTION

An object of the present invention to provide a new grate support element, a grate support structure and an open-ended grinding mill, which are characterized by what is stated in the independent claims. Some preferred embodiments are disclosed in the dependent claims.

The invention is based on the idea of providing a discharge end of an open-ended grinding mill with grate support elements designed to form a conical shape protruding outwards from the volume of a grinding mill shell, when a plurality of such grate support elements are mounted at the discharge end of the open-ended grinding mill.

An advantage of the new grate support element, the new grate support structure and the new open-ended grinding mill is that a more open grate can be provided when compared to the known open-ended mill solutions provided with flat vertical end plate, without compromising the stiffness of the grate and the grinding mill including the bearing journal.

BRIEF DESCRIPTION OF THE DRAWINGS

In the following the invention will be described in greater detail by means of preferred embodiments with reference to the accompanying drawings, in which.

Figure 1:
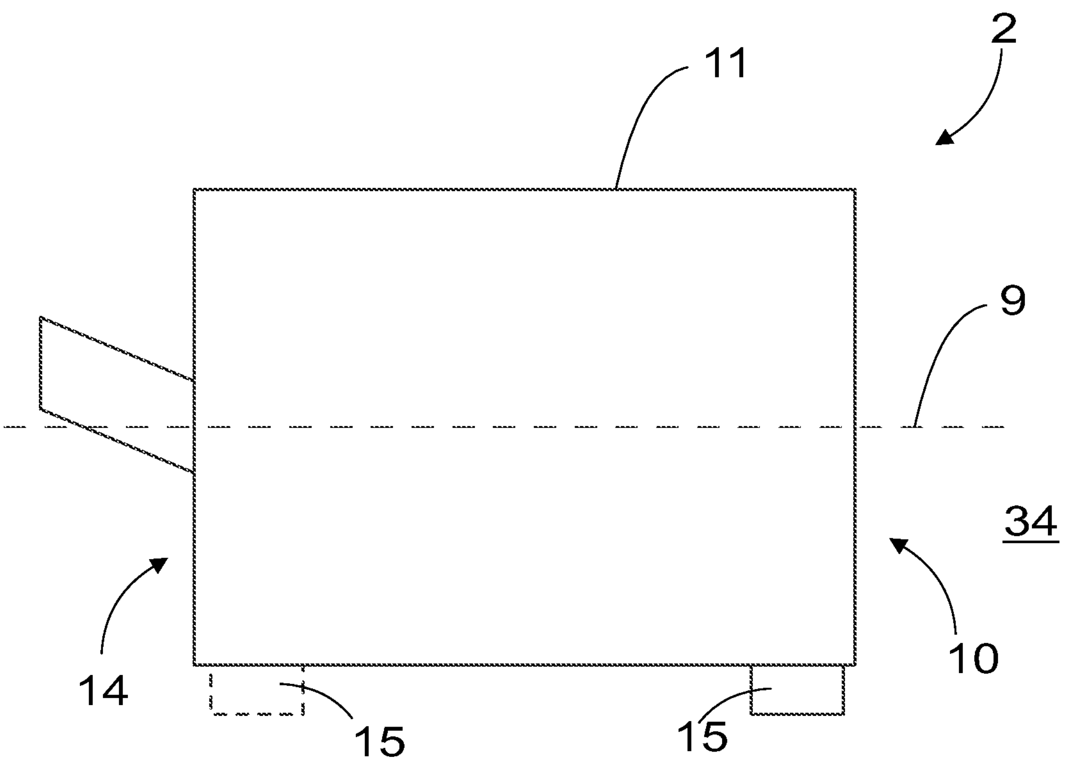
FIG. 1 illustrates schematically a grinding mill seen from a side.

The drawings are intended to illustrate the main principles described in this description and the embodiments only. The drawings are schematic and not shown in scale, and not all the similar features are provided with reference numbers in the drawings for sake of clarity.

DETAILED DESCRIPTION

Figure 2:
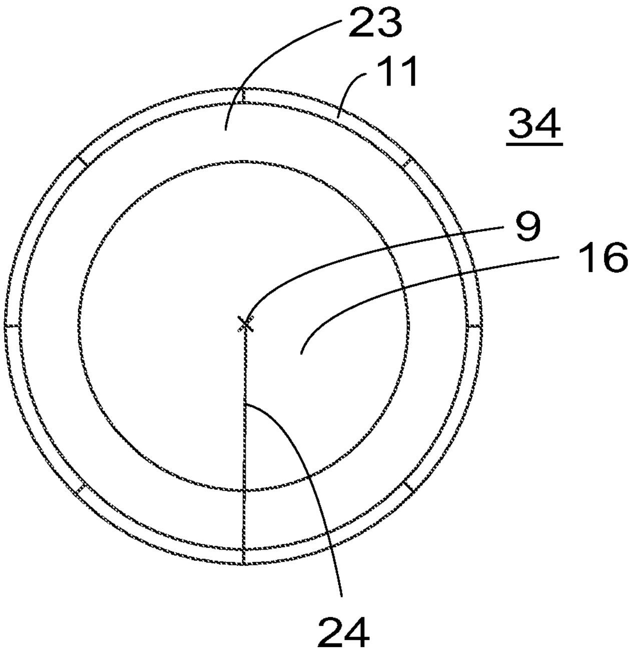
FIG. 2 illustrates schematically an open-ended grinding mill seen from the second end.

FIG. 1 illustrates schematically a grinding mill 2. FIG. 2 illustrates schematically a grinding mill 2 seen from a second end 10, in other words the discharge end 10 of the grinding mill. FIGS. 1 and 2 only show some features of the grinding mill 1 that help understanding the current solution. It is clear for a person skilled in the art that a grinding mill may and usually does comprise other features as well.

A grinding mill 2, such as the grinding mill of FIG. 1, comprises a drum comprising a cylindrical shell 11. In a grinding mill 2 of the current solution, the longitudinal axis 9 of the drum is arranged in a substantially horizontal position in a use position of the grinding mill 2. The longitudinal axis 9 of the drum refers to the axis extending along the centre line of the shell 11 from one end of the cylinder-shaped shell to another. Horizontal position refers to the longitudinal axis 9 extending in a substantially horizontal direction. In other words, the longitudinal axis 9 extends in a direction that is closer to a horizontal direction than a vertical direction. The use position refers to a position the grinding mill 2 is arranged in when used for grinding, for instance for ore grinding, in a production environment.

The drum comprises a first end 14 at the feed end of the shell and a second end at the discharge end 10 of the shell. The feed end refers to the end at which the material to be ground is fed into the drum. The discharge end refers to the end at which the ground material is discharged from the drum. In wet grinding applications the discharged material comprising ground material and possibly liquids is also called slurry in this application.

The grinding mill 2 may comprise various process duties including but not limited to a ball mill, a pebble mill, an autogenous mill (AG mill), or a semi-autogenous mill (SAG mill). Working principles of such grinding mills are known and are not explained in more detail in this description.

The grinding mill 2 typically further comprises a bearing 15 supporting the drum at the discharge end 10. The bearing 15 may comprise any suitable type of bearing, such as a rolling element bearing, a hydrostatic bearing or a hydrodynamic bearing. It should also be noted that the grinding mill 2 may also have additional bearings supporting the drum and/or other parts of the grinding mill 2. Such bearings 15 for supporting the drum of the grinding mill are known as such and are not explained in more detail.

A grinding mill 2 may be an open-ended grinding mill. Open-ended grinding mill refers to a grinding mill that does not have a discharge trunnion, pulp lifters to lift the ground material to the discharge trunnion or a solid discharge head plate. An open-ended grinding mill may comprise a discharge grate 16 instead of the discharge trunnion, pulp lifter and solid discharge head plate, whereby the ground material is discharged through the discharge grate 16. In a fully open-ended grinding mill, there is no need to lift the ground material to discharge it. According to another embodiment, the open-ended grinding mill 2 may comprise a partial head plate 23 at the discharge end. Such a grinding mill may also be called a semi-open-ended grinding mill. A semi-open-ended grinding mill may be similar to the fully open-ended grinding mill, but it may have a partial head plate 23 at the discharge end of the shell extending partially from a perimeter of the shell 11 towards the longitudinal axis 9 of the drum, but without a discharge trunnion and no traditional pulp lifters. The partial head plate 23 at the discharge end 10 of the shell 11 may extend a distance of preferably less than 50 percent, more preferably less than 30 percent and most preferably less than 15 percent of the length the radius 24 of the shell from the edge of the shell 11 towards the longitudinal axis 9 of the drum. The area of the discharge end 10 of the drum extending from the inner edge of the partial head plate 23 towards the longitudinal axis 9 of the drum may define a discharge opening. The discharge opening may be provided with a discharge grate 16. In both types of open-ended grinding mills, in other words in both fully open-ended and semi-open-ended grinding mills, the ground material may, thus, be discharged from the discharge grate 16 straight to the atmosphere.

Figure 3:
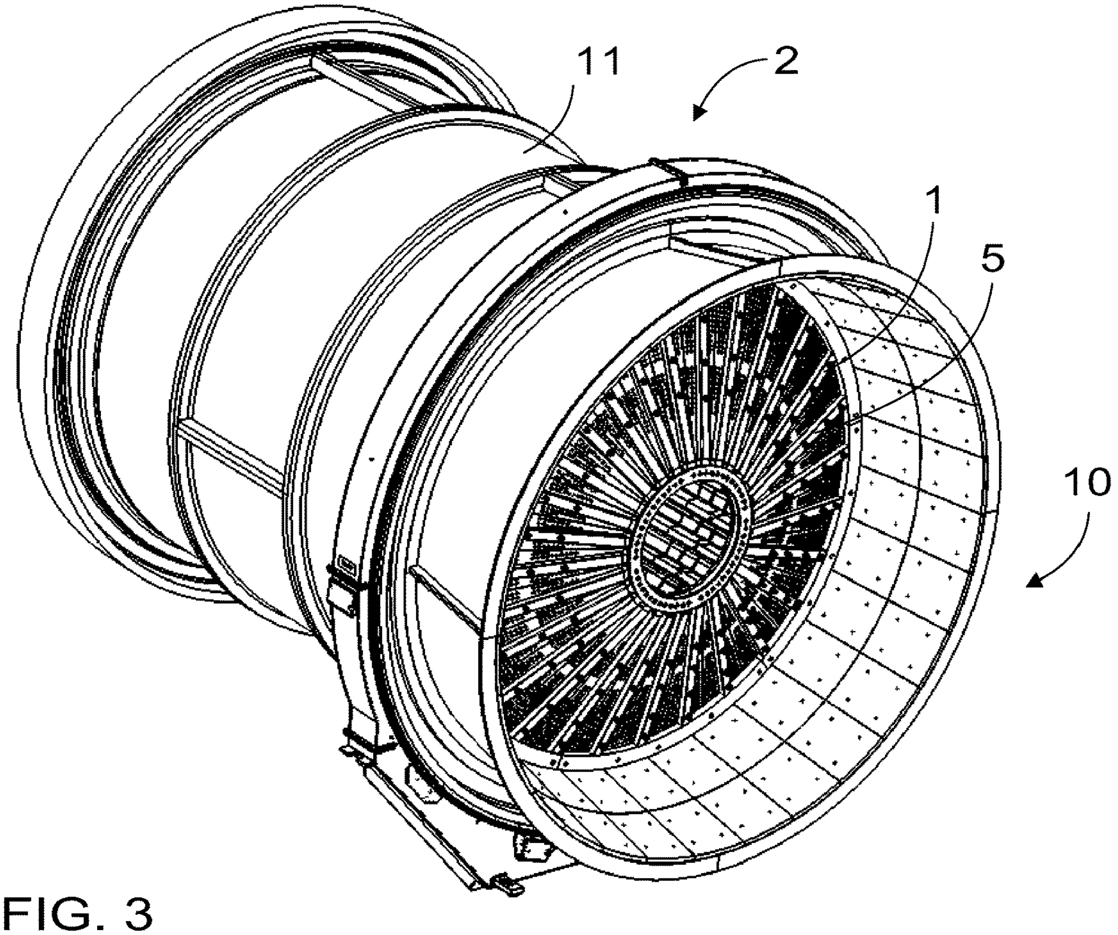
FIG. 3 shows a part of an open-ended grinding mill in perspective.
Figure 4:
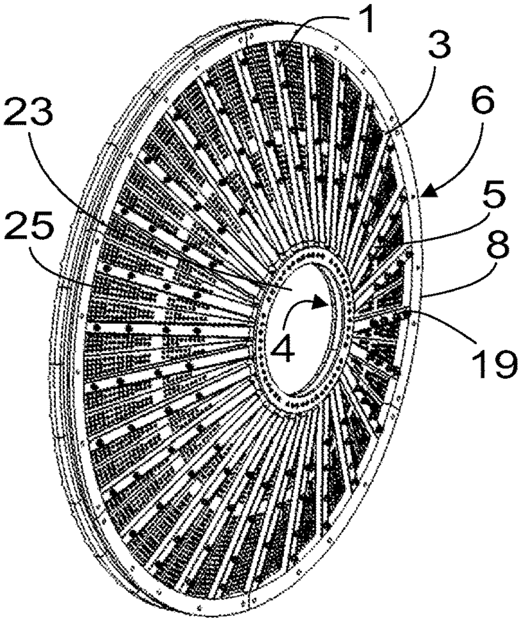
FIG. 4 shows a detail from a discharge end of an open-ended grinding mill in perspective.
Figure 5:
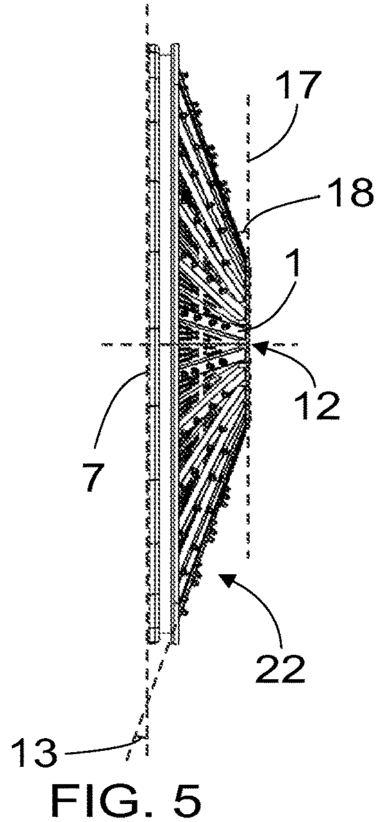
FIG. 5 shows a detail from a discharge end of an open-ended grinding mill shown from a side of the grinding mill.
Figure 6:
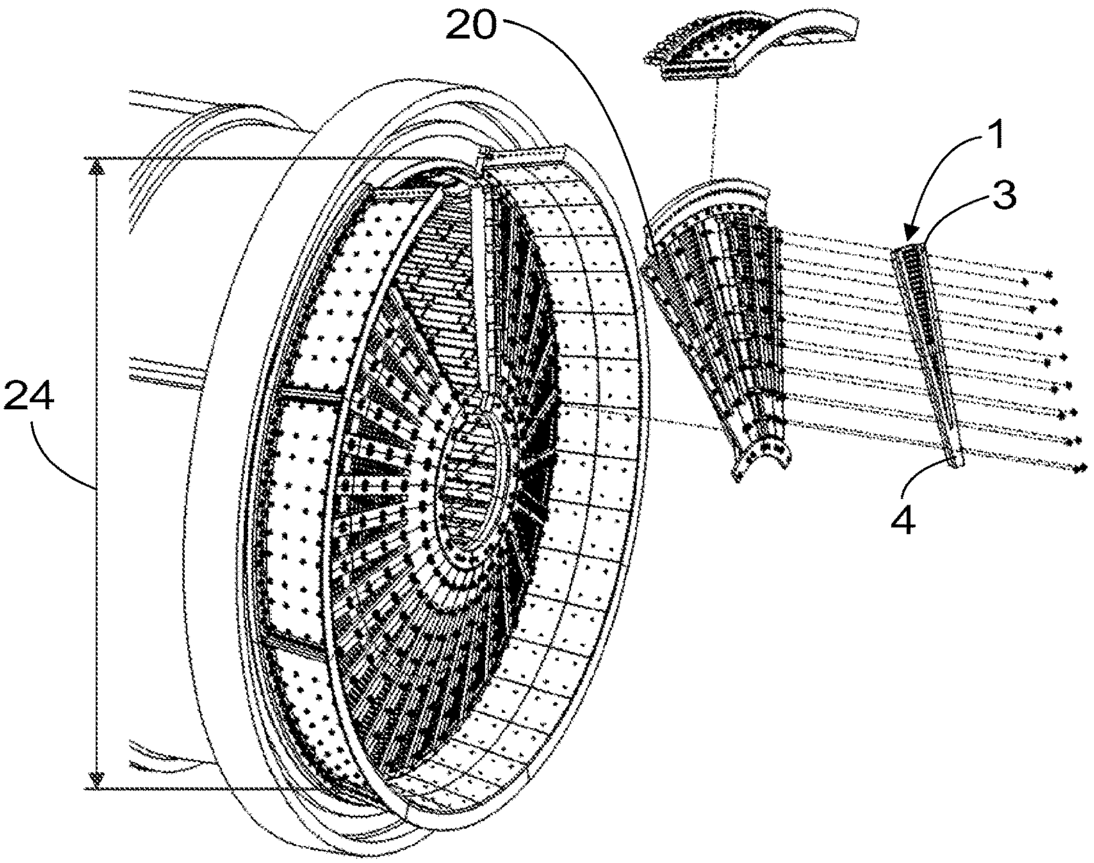
FIG. 6 shows a discharge end of an open-ended grinding mill shown as an exploded view.
Figure 7:
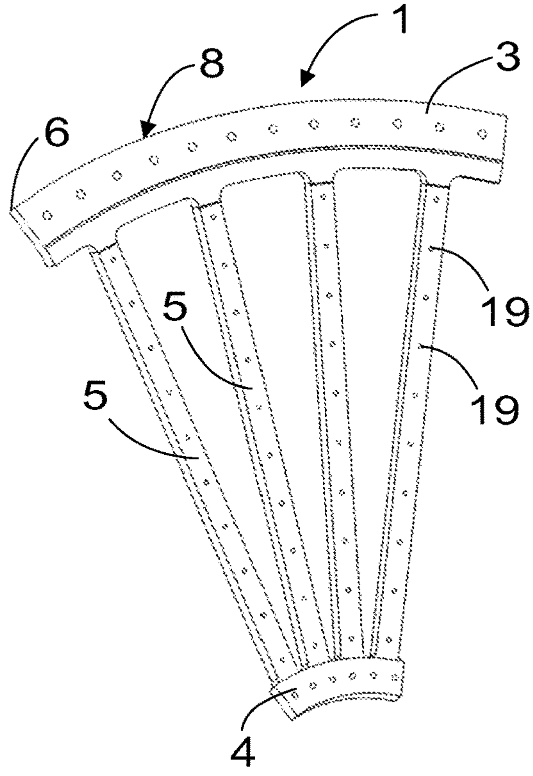
FIG. 7 shows a grate support element according to an example of an embodiment in perspective.
Figure 8:
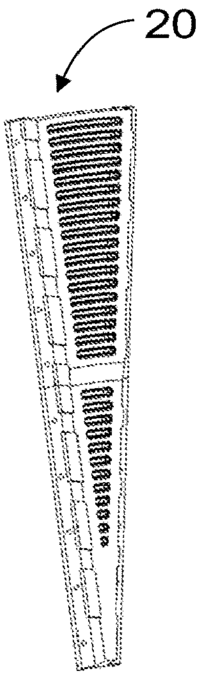
FIG. 8 shows a grate panel according to an example of an embodiment in perspective.

FIG. 3 shows a part of a grinding mill 2, more particularly a part of an open-ended grinding mill 2, in perspective. FIG. 4 shows a detail from a discharge end of an open-ended grinding mill in perspective, FIG. 5 shows a detail from a discharge end of an open-ended grinding mill shown from a side of the grinding mill, and FIG. 6 shows a discharge end of an open-ended grinding mill shown as an exploded view. FIG. 7 shows a grate support element according to an example of an embodiment, and FIG. 8 shows a grate panel according to an example of an embodiment.

According to an aspect and referring to the FIGS. 3 to 8, for example, a grate support element 1 for an open-ended grinding mill 2 comprises an outer perimeter section 3, an inner section 4, and at least one vane 5. The vane 5 is configured to extend between the outer perimeter section 3 and the inner section 4 in such a manner that the vane 5 has an inner section side end connected to the inner section 4 and an outer perimeter section side end connected to the outer perimeter section 3 of the grate support element. The vane 5 extending between the outer perimeter section 3 and the inner section 4 in such a manner that the vane 5 has an inner section side end connected to the inner section 4 and an outer perimeter section side end connected to the outer perimeter section 3 refers to the vane having a first end at the outer perimeter section and another end a second end at the inner section of the grate support element.

The vane 5 is angled with respect to a plane 7 defined by the outer edge 8 of the outer perimeter section 3 in such a manner that the inner section 4 is configured to be provided outwards from the plane 7 defined by the outer edge 8 of the outer perimeter section 3, when the grate support element 1 is mounted to the open-ended grinding mill 2. Thus, the vane 5 is angled with respect to a plane defined by the outer perimeter of the grate support element 1. In other words, the inner section 4 protrudes outwards from the grinding mill volume, when the grate support element 1 is mounted to the open-ended grinding mill 2, more particularly at a discharge end 10 of the open-ended grinding mill 2.

The grate support element 1, thus, refers to an element configured to be mounted at a discharge end 10 of a shell 11 of the open-ended grinding mill 2 and to support one or more grate panel(s) 20 of the open-ended grinding mill 2. The inner section 4 refers to the section of the grate support element 1, which is provided at the end of the grate support element 1 that is directed towards the middle 12 of the cross section of the grinding mill 2 at the discharge end 10, when the grate support element 1 is mounted to the grinding mill 2. Similarly, the outer perimeter section 3 refers to the section of the grate support element 1, which is provided at the end of the grate support element 1 that is directed away from the middle 12 of the cross section of the grinding mill 2 at the discharge end 10, when the grate support element 1 is mounted to the grinding mill 2, in other words at the distal end of the grate support element 1.

According to an embodiment, the vane 5 extends between the outer perimeter section 3 and the inner section 4 in a direction radial with respect to the cross section of the grinding mill 2 in the transverse direction. In such an embodiment, the vanes 5 may thus be configured to extend radially from the outer perimeter of the discharge end of the shell 11, when a plurality of grate support elements 1 or one or more grate support elements 1 comprising a plurality of vanes 5 are mounted to the grinding mill 2.

According to an embodiment, the vane 5 extends between the outer perimeter section 3 and the inner perimeter section 4 in a curved manner. In such embodiments, the vanes may be configured to curve for instance in a direction of a plane defined by the vanes 5 or in a direction transverse to the direction of the plane defined by the vanes 5. The plane defined by the vanes refers to a plane defined by the direction, in which the vane 5 extends from the outer perimeter section 3 towards the inner perimeter section 4. Thus, a curve in a direction of the plane refers to the vane being curved, or angled, with respect to the radial direction directed from the outer perimeter edge 8 towards the middle 12 of the of the cross section of the grinding mill 2, when the grate support element 1 is mounted to a grinding mill 2. The vane 5 may for instance be configured to extend from the outer perimeter section 3 towards the inner perimeter section in a spiralling manner. Similarly, a curve in a direction transverse to the direction of the plane defined by the vanes 5 refers to the vane 5 being configured to be curved towards and/or outwards from the volume of the grinding mill 2, when mounted to the grinding mill 2. According to an embodiment, the angle or the curvature may vary along the length of the vane 5.

According to an embodiment, the angle 13 between the vane 5 and the plane 7 defined by the outer edge 8 of the outer perimeter section 3 is in the range of 5 to 30 degrees. In other words, the vane 5 protrudes outwards from the grinding mill volume, in other words from the inside of the shell 11, at an angle 13 in the range of 5 to 30 degrees, when the grate support element 1 is mounted to the open-ended grinding mill 2, more particularly at a discharge end 10 of the open-ended grinding mill 2.

Figure 9:
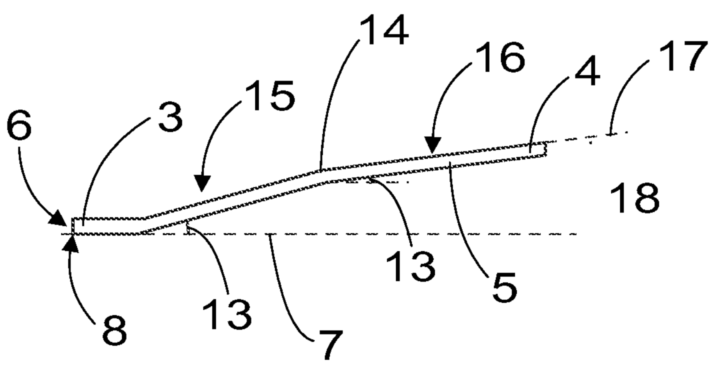
FIG. 9 illustrates a cross section of a grate support element.
Figure 10:
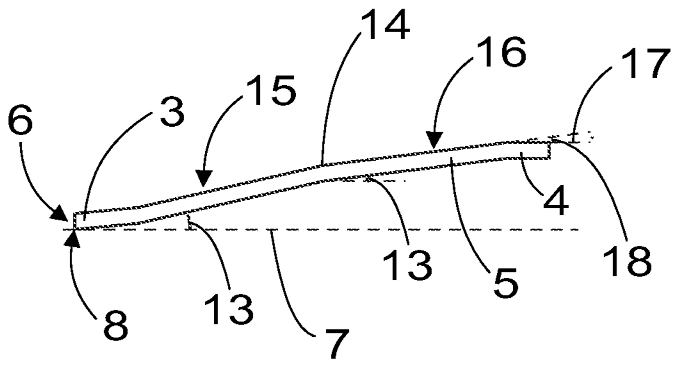
FIG. 10 illustrates a cross section of another grate support element.

According to an embodiment, the angle 13 between the vane 5 and the plane 7 defined by the outer edge 8 of the outer perimeter section 3 varies at one, two or more points 14 along the length of the vane or continuously over the length of the vane. In other words, the angle 13 between the vane 5 and the plane 7 defined by the outer edge 8 of the outer perimeter section 3 may be different at different portions 15, 16 of the length of the vane 5 along the length of the vane 5 extending from the outer perimeter section 3 towards the inner section 4. In other words, according to an embodiment, one, two or more points 14 may be provided along the length of the vane 5, where the angle 13 is configured to change. According to another embodiment, the angle 13 between the vane 5 and the plane 7 defined by the outer edge 8 of the outer perimeter section 3 may be arranged to vary continuously over the length of the vane 5. In such an embodiment, the vane 5 may thus be angled in a curved manner with respect to the plane 7 defined by the outer edge 8 of the outer perimeter section 3. In a further embodiment, the vane 5 may comprise a same angle with respect to the plane 7 defined by the outer edge 8 of the outer perimeter section 3 along a first portion 15 of the length of the vane 5 and a continuously varying angle along a second portion 16 of the length of the vane 5. Depending on the embodiment, the first portion 15 and the second portion 16 of the length of the vane 5 may together for a part of the length of the vane 5 or the whole length of the vane 5. Depending on the embodiment, the first portion 15 or the second portion 16 may be provided on the outer perimeter section 3 side, in other words closer to the outer perimeter of the grate support element 1. Embodiments with such points 14 and portions 15, 16 are shown in FIGS. 9 and 10, wherein FIG. 9 illustrates a cross section of a grate support element and FIG. 10 illustrates a cross section of another grate support element.

According to an embodiment, the grate support element 1 comprises a shape of a conical wheel or a conical disc, or a shape of a section of a conical wheel or a conical disc. The grate support element 1 comprising a shape of a section of a conical wheel or a conical disc refers to such a shape that a plurality of grate support elements 1 arranged adjacently to one other in such a manner, that their inner sections 4 are directed to a common middle point and their outer perimeter sections 3 are directed away from the common middle point, form a conical wheel shape or a conical disc shape.

According to an embodiment, the vane 5 is angled with respect to a second plane 17 defined by the inner section 4, in addition to being angled with respect to the plane 7 defined by the outer perimeter section 3. Depending on the embodiment, the plane 7 defined by the outer perimeter section 3 may or may not be parallel with respect to the second plane 17 defined by the inner section 4. In other words, the second angle 18 between the vane 5 and the second plane 17 defined by the inner section 4 may be the same as the angle 13 between the vane 5 and the plane 7 defined by the outer perimeter section 3, such as in FIG. 5, for example, or it may be different.

According to another embodiment, the vane 5 may not be angled with respect to a second plane 17 defined by the inner section 4. In other words, the inner section 4 and the vane 5 may have the same angle with respect to the plane 7 defined by the outer perimeter section 3.

According to an embodiment, the inner section 4 connecting the vanes 5 at the middle end of the grate support element 1 is configured to form a ring-like inner perimeter for the grate support element, such as in the embodiments of FIGS. 3 to 6. According to another embodiment, the inner section 4 connecting the vanes 5 at the middle end of the grate support element 1 is configured to form a solid round centre part for the grate support element 1.

According to an embodiment, the vane 5 is provided with at least two openings 19 along its length for attaching the grate support element 1 to a grate panel 20. According to a further embodiment, the vane 5 comprises at least one recess (not shown) and the openings 19 are provided in such a recess in such a manner that at least a part of a head of a bolt provided in the opening 19 is provided in the recess.

According to an embodiment, the grate support element 1 and a grate panel 20 are attached fixedly to one another to form a uniform structure. According to another embodiment, one grate support element 1 alone forms a grate support structure 22.

According to an embodiment, a grate support structure 22 comprises at least two grate support elements 1 described in this description and the accompanying drawings.

According to an embodiment, grate support elements 1 described in this description are arranged radially along the periphery of a grate support structure 22 such as to form a disc-like or wheel-like grate support structure 22 comprising a conical shape, wherein the middle of the grate support structure 22 extends outwards from the plane 7 formed by the periphery of the grate support structure 22, when the grate support structure 22 is mounted on the grinding mill 2. The plane 7 formed by the periphery of the grate support structure 22 is, thus, the same plane 7 that is defined by the outer perimeter sections 3 of the grate support elements 1 forming the grate support structure 22.

According to an embodiment, the grate support structure 22 comprises an aperture 23 in the middle part of the grate support structure 22, the aperture 23 being defined by the inner section(s) 4 of the grate support element(s) 1, more particularly defined by inner perimeters of inner sections 4 configured to form a ring-like inner perimeter. According to an embodiment, the aperture 23 has a diameter in a range of 0 to 50 percent of the diameter 24 of the outer perimeter of the grate support structure 22.

According to an embodiment, an open-ended grinding mill 2 comprises a grate support structure 22 and/or at least one grate support element 1 described in this description. According to an embodiment, such an open-ended grinding mill 2 further comprises a grate 25 and a cylindrical shell 11, and the grate support structure 22 is mounted to the grate 25 and the cylindrical shell 11. According to a further embodiment, the grate support structure 22 is mounted removably at least to the cylindrical shell 11.

According to an embodiment, a grate panel 20 may comprise the whole sector or segment of the grate 25 or two or more grate panels may be configured to be mounted adjacent to one another in a radial direction along a vane 5 of a grate support element 1 and/or circumferentially. In other words, the grate 25 may comprise one or more grate panels. The discharge grate 16 may, thus, comprise at least the grate 25 comprising at least one grate panel 20 and at least one grate support structure 22 comprising at least one grate support element 1.

According to an embodiment, in an open-ended grinding mill 2 described in this description, the middle part of the grate support structure 22 comprising the inner section 4 of the grate support structure 22 extends outwards from the cylindrical shell 11. More particularly, in such an embodiment, the middle part of the grate support structure 22 comprising the inner section 4 of the grate support structure 22 extends outwards from the cylindrical shell 11 in the longitudinal direction of the cylindrical shell 11.

It will be obvious to a person skilled in the art that, as the technology advances, the inventive concept can be implemented in various ways. The invention and its embodiments are not limited to the examples described above but may vary within the scope of the claims.

The invention claimed is:

1. A grate support element configured to be mounted at a discharge end of an open-ended grinding mill that is devoid of a discharge trunnion, pulp lifters to lift a ground material to the discharge trunnion or a solid discharge head plate, wherein the grate support element comprises:

an outer perimeter section having an outer edge;

an inner section; and at least one vane extending between the outer perimeter section and the inner section in such a manner that the at least one vane has an inner section side end connected to the inner section and an outer perimeter section side end connected to the outer perimeter section, the vane being angled with respect to a plane defined by the outer edge of the outer perimeter section such that the inner section is spaced outwards from the plane defined by the outer edge of the outer perimeter section.

2. The grate support element according to claim 1, wherein the angle between the vane and the plane defined by the outer edge of the outer perimeter section is in the range of 5 to 30 degrees.

3. The grate support element according to claim 1, wherein the angle between the vane and the plane defined by the outer edge of the outer perimeter section varies at one, two or more discrete points along the length of the vane or continuously over the length of the vane.

4. The grate support element according to claim 1, wherein the grate support element comprises a shape of all or a section of a conical wheel.

5. The grate support element according to claim 1, wherein the inner section includes an outer edge that defines a second plane, wherein the vane is angled with respect to the second plane defined by the inner section.

6. The grate support element according to claim 1, wherein the vane is provided with at least two openings along its length for attaching the grate support element to a grate panel.

7. The grate support element according to claim 6, wherein the vane comprises at least one recess and wherein the openings are provided in such a recess in such a manner that at least a part of a head of a bolt provided in the opening is provided in the recess.

8. The grate support element according to claim 1, wherein a grate panel attached to the grate support element to form a uniform structure.

9. The grate support element according to claim 1, wherein the an outer diameter of the outer perimeter section is greater than an outer diameter of the inner section such that the vane extends in a radial direction from the outer diameter of the outer perimeter section to the outer diameter of the inner section.

10. The grate support element according to claim 1, wherein the vane extends between the outer perimeter section and the inner section in a curved manner such that the inner section is spaced outwardly relative to the outer perimeter section.

11. The grate support element according to claim 1, wherein one grate support element alone forms a grate support structure.

12. A grate support structure, comprising at least two grate support elements according to claim 1, wherein the at least two grate support elements are arranged the grate support structure having a conical shape, wherein a middle part of the grate support structure extends outwards from a plane formed by an outer perimeter of the grate support structure.

13. The grate support structure according to claim 12, wherein the grate support structure comprises an aperture in the middle part of the grate support structure, the aperture being defined by the inner sections of the grate support elements.

14. The grate support structure according to claim 13, wherein the aperture has a diameter up to 50 percent of the diameter of the outer perimeter of the grate support structure.

15. An open-ended grinding mill comprising the grate support structure according to claim 12.

16. The open-ended grinding mill according to claim 15, wherein the open-ended grinding mill further comprises a grate and a cylindrical shell, and wherein the grate support structure is mounted to the grate and the cylindrical shell.

17. The open-ended grinding mill according to claim 16, wherein the grate support structure is mounted removably at least to the cylindrical shell.

18. The open-ended grinding mill according to claim 15, wherein the middle part of the grate support structure comprising the inner section of the grate support structure extends outwards from the cylindrical shell.

* * * * *